UNITED STATES PATENT OFFICE.

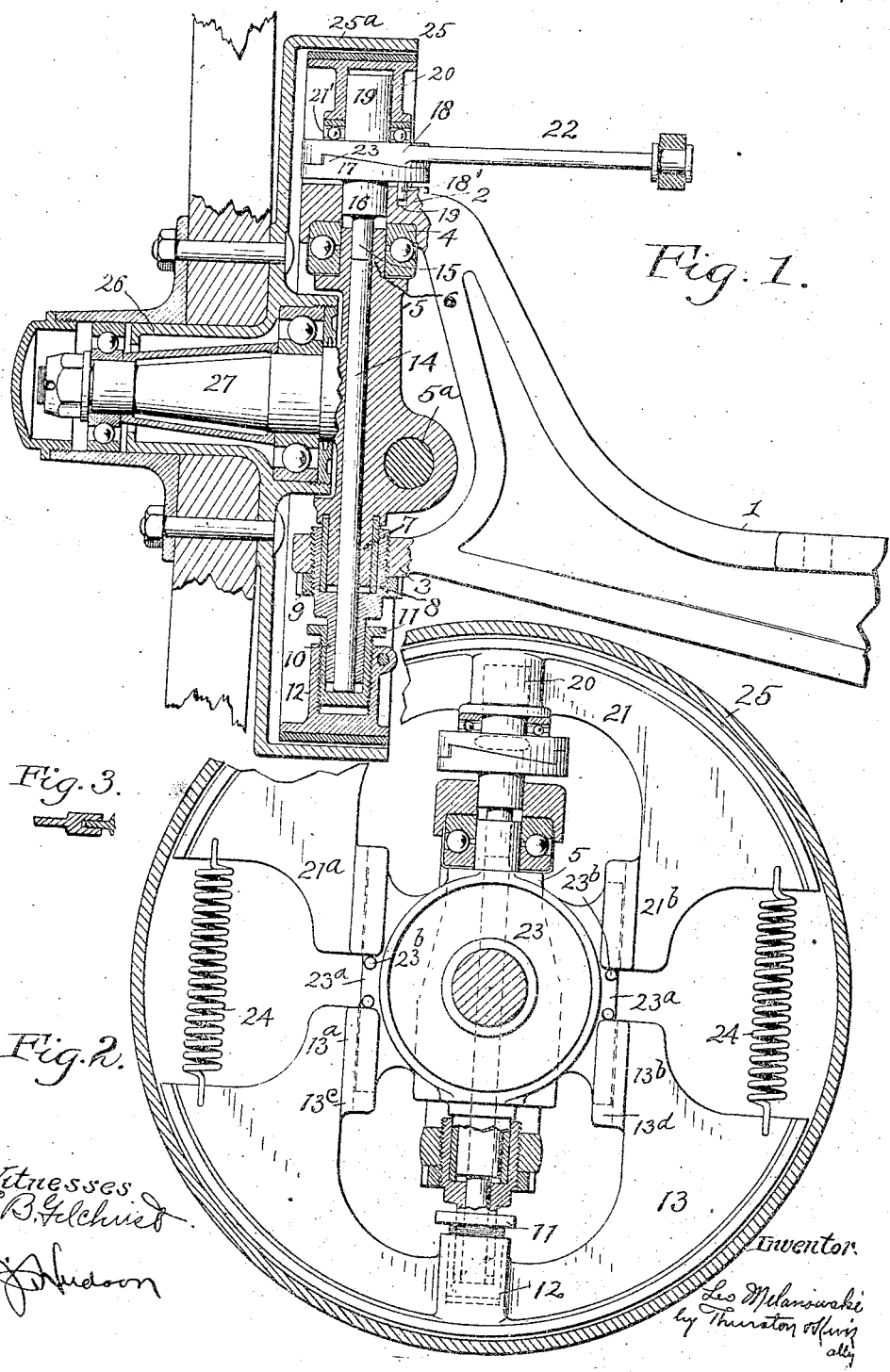

LEO MELANOWSKI, OF CLEVELAND, OHIO, ASSIGNOR, BY MESNE ASSIGNMENTS, TO THE WHITE MOTOR COMPANY, OF CLEVELAND, OHIO, A CORPORATION OF OHIO.

FRONT-WHEEL-BRAKE MECHANISM.

1,218,794.  Specification of Letters Patent.  Patented Mar. 13, 1917.

Application filed June 8, 1914, Serial No. 843,665. Renewed January 29, 1917. Serial No. 145,306.

*To all whom it may concern:*

Be it known that I, LEO MELANOWSKI, a subject of the Czar of Russia, residing at Cleveland, in the county of Cuyahoga and State of Ohio, have invented a certain new and useful Improvement in Front-Wheel-Brake Mechanism, of which the following is a full, clear, and exact description.

This invention relates to automobile construction, more particularly to the front axle and the wheels which are hingedly connected thereto, the object being to provide a brake for the front wheels which shall be simple in construction, compact and durable.

Generally speaking, the invention comprises the elements and combinations thereof set forth in the accompanying claims.

References should be had to the accompanying drawings forming a part of this specification, in which Figure 1 is a front elevation with portions in section showing a portion of a front axle with a wheel hub articulated thereon and the brake mechanism as applied to a front wheel. Fig. 2 is a side elevation of the brake drum with the coöperating parts of the brake mechanism. Fig. 3 is a section which shows the manner of engagement between the brake shoe and its guiding support.

Applying a braking force to the front wheels upon a motor vehicle has many advantages. Among them may be named that of accomplishing the braking action with much less discomfort to the occupants of the vehicle, due to jerking, and further it practically prevents any skidding of the vehicle.

Various attempts have been made with a view to applying brakes to the front wheels of a motor vehicle, but the constructions proposed for accomplishing this result have generally been complicated, and are undesirable from a commercial and manufacturing point of view, due to the likelihood of their getting out of order and to the mechanical difficulties involved in their manufacture. It has been my purpose in the construction herewith proposed to eliminate those undesirable features.

An axle of usual construction is indicated at 1. This axle is provided with extending arms 2 and 3. The arm 2 receives one cup of a ball bearing 4. The other cup is engaged by one end of the knuckle 5, which knuckle has a neck 6, that extends upwardly within the ball bearing 4. The knuckle 5 at its lower end is provided with a neck 7, which extends within a sleeve 8, the sleeve being locked with respect to the arm 3 by means of a lock nut 9. The sleeve 8 is provided with a projecting neck 10, which is received by a hollow nut 11, which nut is threaded upon its exterior portions and engages with the threaded interior of a hollow portion 12, which hollow portion forms a part of a brake shoe that may generally be represented at 13.

The knuckle 5 is provided with a hollow substantially cylindrical passageway through the central portion thereof, and through this opening there extends a rod 14. This rod also extends through the sleeve 8, and bears against the head of the hollow nut 11. Obviously, the nut 11 may be adjusted with respect to the hollow portion 12 of the brake shoe 13, so as to compensate for wear of the shoes, as will be touched upon later.

At the upper end of the head 5, there is a stub rod 15, which extends within the hollow portion of the head and rests against the rod 14. This rod is enlarged at 16, so as to have a working fit within an opening in the arm 2. Upon the portion 16 just mentioned is a cam plate 17, which is provided with a pin 18' that extends within an opening 19 in the arm 2. From this construction it will be apparent that the cam plate 17 and the parts secured to or integral therewith may move in a longitudinal direction, but cannot rotate.

Coöperating with the cam plate 17 is a cam plate 18, and extending upwardly from this plate 18 is a cylindrical projection 19 that engages with a working fit the interior of a hollow member 20, which forms a part of a brake shoe 21. Between the cam plate 18 and the lower flange of the hollow member 20 there is a ball bearing 21', which may be of usual construction. The plate 18 has secured to it or made integral with it, an arm 22 extending outwardly, and the operation of this arm will serve to turn the cam plate 18 with respect to the cam plate 17.

The plates 17 and 18 are provided with complementary shoulders and inclined portions represented generally at 23, so that when the plates 17 and 18 are turned relatively to each other, in the present instance in a clockwise direction, these plates 17 and 18 will be moved apart. Obviously, the number of cam shoulders and inclines which may be employed is immaterial, and I consider it within the province of my invention to use as many such shoulders and inclines and of such shape as may be desirable or expedient.

The brake shoes 13 and 21, as shown in Fig. 2, are provided with portions which extend upon opposite sides of the hollow members 12 and 20, and the brake shoes are of such width that they will perform their braking function in proper fashion. The exact design as to the width of these shoes is merely a matter of mechanical skill.

The shoe 13 is provided with arms 13ª and 13ᵇ, these arms being provided with flanges 13ᶜ and 13ᵈ, these flanges being spaced apart and engaging with guiding ribs 23ª, which extend from opposite sides of a member 23; which member is carried by the knuckle 5. The upper brake shoe 21 is similarly provided with arms 21ª and 21ᵇ, which also have flanges 21ᶜ and 21ᵈ that engage with the guiding ribs 23ª. It will be apparent from the construction that each brake shoe is supported at three points, namely, at the point of support of the hollow member, at the center thereof, and by the flanges which engage with the guiding ribs 23ª. All of these points of support permit the movement of the brake shoes in a longitudinal direction with respect to their points of support, so that the brake shoes may move outwardly toward the brake drum or inwardly away from the brake drum.

The operating mechanism of the brake shoes is so constructed that its normal operation is to thrust the brake shoes outwardly into contact with the brake drum, and for the purpose of retrieving the brake shoes I have provided springs 24 which engage oppositely disposed portions upon the brake shoes, thereby normally drawing the brake shoes into inoperative or "off" position. Pins 23ᵇ extend through flanges 23ª and limit the movement of shoes 13 and 21.

A brake drum is indicated at 25, and comprises the annular flange 25ª, as is usual. This drum may be secured to the wheel in any desired manner, but as I have shown it, it forms a part of the hub construction, which is indicated at 26. This hub construction is of a type well known in the trade, and really requires no explanation as to details of construction. It should be noted, however, that the short axle or wheel axle 27 is secured to or formed integral with the knuckle 5 which is usual construction,—this axle supporting the hub construction, and the hub, of course, supporting the radial spokes of the wheel. The hub 5 is provided with a portion 5ª, which is adapted to be connected with the usual steering mechanism in a manner which will be well understood by those skilled in the art.

It will be noted that as the knuckle 5 is turned during the operation of steering the front wheels, the brake drum 25, together with the brake shoes 13 and 21, will be turned with it, so that the brake shoes are always in proper position to engage with the brake drum 25. The operating mechanism for the brake shoes, however, does not partake of any rotary movement due to the steering of the wheels, but until actuated remains in a fixed position with respect to the stationary axle.

Although the operation of the device will undoubtedly be well understood from the foregoing description, I will here append a short description of its operation.

When the lever 22 is moved in a clockwise direction, the plates 17 and 18 are moved apart by virtue of the movement of the engaging cam surfaces upon each other. This movement will thrust upon the member 20 of the brake shoe 21, causing the brake shoe to be moved into engagement with the brake drum 25. The plate 17 will be thrust downward, and this thrust will be communicated through the rod 14 and the hollow nut 11 to the hollow member 12 of the brake shoe 13, pushing this brake shoe into engagement with the drum 25. The brake shoes will then retard the rotation of the drum 25 and the wheel to which it is connected in a well understood manner. For the purpose of providing an adjustment to take care of the wear of the brake shoes, and to take up any lost motion in the parts of the brake mechanism, the hollow nut 11 is made adjustable with respect to the shoe 13.

Various modifications may be made in the particular construction which is herein shown and described without departing from the spirit of this invention.

Having described my invention, I claim:

1. In a vehicle, the combination with a main axle; a knuckle pivotally secured upon the main axle; a wheel axle carried by the knuckle; a brake drum upon the wheel; a brake element associated with the drum; a rod extending axially through the knuckle; a supporting member for the end of the rod, said supporting member being adjustably carried by the brake element whereby the relative position of the rod and the brake element may be adjusted; cam mechanism associated with the rod whereby when the cam mechanism is operated the rod pushes the brake element into contact with the drum.

2. In a vehicle, the combination with a main axle, a knuckle pivotally secured upon the main axle, a wheel axle secured to the knuckle, a wheel upon the wheel axle, a brake drum associated with the wheel, two brake elements associated with the drum, thrust members extending axially with respect to the knuckle, and having operative engagement with the brake elements, a cam engaging the adjacent ends of the thrust members, and means when actuated causing the thrust members to push the brake elements into contact with the brake drum.

3. In a vehicle, the combination with a main axle, a knuckle pivotally mounted on the main axle, a wheel axle carried by the said knuckle, a wheel carried by the wheel axle, a brake drum carried by the wheel, a pair of oppositely disposed brake elements supported adjacent the drum, a rod extending axially through the said knuckle and operatively engaging one brake element, a cam member operatively engaging said rod, a second cam member coöperating with the first cam member, and operatively engaging with the second brake element, one of said cam members being secured against rotation, and means for operating the other of said cam elements whereby the brake elements are pushed into engagement with the brake drum.

4. In a vehicle, the combination with a main axle, a knuckle pivotally mounted on the main axle, a wheel axle carried by the said knuckle, a wheel carried by the wheel axle, a brake drum carried by the wheel, a plurality of brake shoes adapted to have contact with the brake drum, a hollow post upon each shoe, a thrust member extending into each of the said hollow members of the brake shoes, coöperating cam members between the said thrust members, coöperating with the brake shoes, one of said cam members being adapted to be moved to thrust outwardly the cylindrical members, thereby pushing the brake shoes into contact with the brake drum.

5. In a vehicle, the combination with a main axle, a knuckle pivotally secured upon the main axle, a wheel axle carried by the knuckle, a brake drum upon the wheel, a brake shoe adapted to engage the brake drum, said brake shoe having extending arms which are adapted to slidably engage a portion of the knuckle, mechanism for operating said shoe, comprising a stationary cam-shaped element which is associated with the axle and non-rotatable, a movable cam member coöperating with the first mentioned cam member, the shoe being directly engaged by the last mentioned cam member, means for operating the last mentioned cam member, whereby the shoe is pushed into engagement with the brake drum.

6. In a vehicle, the combination with a main axle, a knuckle pivotally secured upon the main axle, a wheel axle carried by the knuckle, a wheel upon the wheel axle, a brake drum associated with the wheel, a pair of brake shoes adapted to engage the brake drum, the said shoes being provided with arms which slidably engage with a portion of the knuckle, a thrust member extending through the knuckle, one end of the thrust member being associated with one of the shoes, a thrust member associated with the other shoe, a pair of cam members between the said thrust members, one of said cam members being mounted to be non-rotatable, means for operating the other of said cam members, whereby the thrust members are pushed apart to cause the brake shoes to engage with the brake element.

In testimony whereof, I hereunto affix my signature in the presence of two witnesses.

LEO MELANOWSKI.

Witnesses:
A. J. HUDSON,
L. I. PORTER.